(12) United States Patent
Bader

(10) Patent No.: US 7,760,644 B2
(45) Date of Patent: Jul. 20, 2010

(54) IP MULTISERVICE NETWORK AND METHOD FOR MAKING RESOURCE RESERVATIONS FOR PRIORITY TRAFFIC

(75) Inventor: Attila Bader, Fot (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 174 days.

(21) Appl. No.: 11/817,737

(22) PCT Filed: Mar. 3, 2005

(86) PCT No.: PCT/IB2005/000547

§ 371 (c)(1), (2), (4) Date: Sep. 4, 2007

(87) PCT Pub. No.: WO2006/092645

PCT Pub. Date: Sep. 8, 2006

(65) Prior Publication Data

US 2008/0192632 A1     Aug. 14, 2008

(51) Int. Cl.
     H04L 12/26    (2006.01)
(52) U.S. Cl. ......................... 370/235; 370/230; 370/352
(58) Field of Classification Search ............ 370/395.41, 370/348, 395.21, 395.42, 352–356, 230, 370/230.1, 231, 235; 709/226, 229
See application file for complete search history.

(56) References Cited

U.S. PATENT DOCUMENTS

| 6,072,773 | A | * | 6/2000 | Fichou et al. ............... 370/230 |
| 6,201,971 | B1 | * | 3/2001 | Purnadi et al. .............. 455/450 |
| 6,934,258 | B1 | * | 8/2005 | Smith et al. ................. 370/238 |
| 7,012,919 | B1 | * | 3/2006 | So et al. ...................... 370/392 |
| 7,023,843 | B2 | * | 4/2006 | Ruutu et al. ................. 370/388 |
| 7,035,279 | B2 | * | 4/2006 | Bruckman ................... 370/460 |
| 7,180,855 | B1 | * | 2/2007 | Lin .............................. 370/230 |
| 7,190,700 | B2 | * | 3/2007 | Choi ........................... 370/468 |
| 7,191,231 | B2 | * | 3/2007 | Miernik et al. .............. 709/225 |
| 7,209,437 | B1 | * | 4/2007 | Hodgkinson et al. ........ 370/230 |
| 7,457,287 | B1 | * | 11/2008 | Shaffer et al. ............... 370/389 |
| 7,477,657 | B1 | * | 1/2009 | Murphy et al. .............. 370/468 |
| 2001/0025310 | A1 | | 9/2001 | Krishnamurthy |

(Continued)

FOREIGN PATENT DOCUMENTS

EP    1211851 A    6/2002

*Primary Examiner*—Chi H. Pham
*Assistant Examiner*—Kevin Mew
(74) *Attorney, Agent, or Firm*—Roger S. Burleigh

(57) ABSTRACT

A multiservice IP network and a method are described herein that use an enhanced QOS message which makes it possible for an IP router to reserve resources for and admit a high priority traffic flow without needing to terminate an existing low priority traffic flow. In accordance with the present invention, in the event an emergency reservation request arrives at an IP router and there are not enough resources to support the high priority traffic flow, then the IP router reduces the reservation of one or more low priority traffic flows to a reduced level. The IP router also sends a notification message to the sender indicating that the reservations have been reduced. Thereafter, the high priority traffic flow can be admitted. As such, if there is enough adaptive traffic in the multiservice IP network, then the low priority calls need not be terminated instead only the resources are reduced to a lower but still acceptable QoS level. And, when traffic conditions improve the reduced reservations can be increased back to the original level.

19 Claims, 6 Drawing Sheets

U.S. PATENT DOCUMENTS

2002/0059432 A1* 5/2002 Masuda et al. .............. 709/227
2003/0074443 A1* 4/2003 Melaku et al. .............. 709/224
2003/0093526 A1* 5/2003 Nandagopalan et al. ..... 709/225
2004/0081093 A1* 4/2004 Haddock et al. ............ 370/230
2005/0226251 A1* 10/2005 Krzanowski et al. ... 370/395.41
2007/0081555 A1* 4/2007 Yaqub ........................ 370/468
2008/0112312 A1* 5/2008 Hermsmeyer et al. ....... 370/228
2009/0252105 A1* 10/2009 Chun et al. ................. 370/329

* cited by examiner

```
                  31            2423             16 15            8 7              0
                  +-+-+-+-+-+-+-+-+-+-+-+-+-+-+-+-+-+-+-+-+-+-+-+-+-+-+-+-+-+-+-+-+
              1   |                                                                |
                  +-+-+-+-+-+-+-+-+-+-+-+-+-+-+-+-+-+-+-+-+-+-+-+-+-+-+-+-+-+-+-+-+
              2   |                                                                |
                  +-+-+-+-+-+-+-+-+-+-+-+-+-+-+-+-+-+-+-+-+-+-+-+-+-+-+-+-+-+-+-+-+
              3   |                                                                |
                  +-+-+-+-+-+-+-+-+-+-+-+-+-+-+-+-+-+-+-+-+-+-+-+-+-+-+-+-+-+-+-+-+
              4   |     Acceptable Token Bucket Rate    (ar)                       |
                  +-+-+-+-+-+-+-+-+-+-+-+-+-+-+-+-+-+-+-+-+-+-+-+-+-+-+-+-+-+-+-+-+
              5   |     Acceptable Token Bucket Size    (ab)                       |
                  +-+-+-+-+-+-+-+-+-+-+-+-+-+-+-+-+-+-+-+-+-+-+-+-+-+-+-+-+-+-+-+-+
              6   |     Acceptable Peak Data Rate       (ap)                       |
                  +-+-+-+-+-+-+-+-+-+-+-+-+-+-+-+-+-+-+-+-+-+-+-+-+-+-+-+-+-+-+-+-+
              7   |     Acceptable Minimum Policed Unit (am)                       |
                  +-+-+-+-+-+-+-+-+-+-+-+-+-+-+-+-+-+-+-+-+-+-+-+-+-+-+-+-+-+-+-+-+
              8   |     Acceptable Maximum Packet Size  (aM)                       |
                  +-+-+-+-+-+-+-+-+-+-+-+-+-+-+-+-+-+-+-+-+-+-+-+-+-+-+-+-+-+-+-+-+
              9   |                                                                |
                  +-+-+-+-+-+-+-+-+-+-+-+-+-+-+-+-+-+-+-+-+-+-+-+-+-+-+-+-+-+-+-+-+

31            2423             16 15            8 7              0
                  +-+-+-+-+-+-+-+-+-+-+-+-+-+-+-+-+-+-+-+-+-+-+-+-+-+-+-+-+-+-+-+-+
              9   |            Acceptable Rate   (aR)                              |
                  +-+-+-+-+-+-+-+-+-+-+-+-+-+-+-+-+-+-+-+-+-+-+-+-+-+-+-+-+-+-+-+-+
```

FIG. 5

IP MULTISERVICE NETWORK AND METHOD FOR MAKING RESOURCE RESERVATIONS FOR PRIORITY TRAFFIC

BACKGROUND OF THE INVENTION

1. Field of the Invention

The present invention relates in general to a multiservice Internet Protocol (IP) network and a method that supports an enhanced QoS message that contains two levels of reservations which makes it possible for IP router(s) to reserve resources for a high priority traffic flow and admit the high priority traffic flow without needing to terminate an existing low priority traffic flow.

2. Description of Related Art

In a multiservice IP network, resource reservation is needed to provide Quality of Service (QoS) for real-time traffic. To address this requirement, the Internet Engineering Task Force (IETF) standardization organization specified the RSVP (Resource Reservation Protocol) signaling protocol. The RSVP signaling protocol is used to make resource reservations in IP routers and is also used to provide integrated services for real-time traffic flows and non real-time traffic flows in the Internet. Following are several documents which describe in detail the RSVP signaling protocol and the Integrated Services architecture:

R. Braden et al., "Resource Reservation Protocol (RSVP)—Version 1 Functional Specification", RFC 2205, Sep. 1997.
   R. Braden, et al., "Integrated Services in the Internet Architecture: an Overview", RFC 1633, 1994.
   J. Wroclawski, "The Use of RSVP with IETF Integrated Services", RFC 2210, Sep. 1997.

The contents of these documents are incorporated by reference herein.

In a multiservice IP network, the QoS has to be ensured for the real-time traffic flows. As such, before a real-time traffic flow is entered into the multiservice IP network, the RSVP signaling protocol requires that RSVP signaling messages be used to reserve resources in each IP router along a data path that is going to be used to deliver the real-time traffic flow. These resources are identified by a flow ID. If the reservation is successful, then the data flow can be entered into the multiservice IP network.

The RSVP signaling protocol also requires that the per flow reservation states be stored in each IP router along the data path. The reservation states are soft states which means that they need to be refreshed by sending periodic refresh messages. If a reserved state is not refreshed, then the state and the corresponding resources are removed after a time-out period. Reservations can also be removed by an explicit tear down message. The storing and maintaining of per flow reservation states in each IP router can be a problem in large networks, where the number of flows and therefore the number of reservation states is high. The IP routers may not have enough capacity to store and maintain all of these reservation states.

After recognizing this scalability problem, the IETF specified the RSVP aggregation method which allows IP routers to make reservations for aggregated flows. The aggregated reservations are identified by a DiffServ code point (DSCP) and require the storing of one aggregated reservation state which is used for multiple flows in the IP routers. The aggregated reservation state does not need to be created, modified or refreshed for each flow request.

Because, the RSVP aggregation method and several other extensions have been made to the RSVP signaling protocol, the IETF decided to redesign the protocol in the Next Steps In Signaling (NSIS) Working Group (WG). And, even though the scope of NSIS is wider than QoS signaling, one of it's applications is the QoS signaling application. This QoS application is being developed to meet the new signaling requirements of the multiservice IP network. For more details about the NSIS and NSIS QoS application reference is made to the following document:

M. Brunner: Requirements for Signaling Protocols, RFC3726, April 2004.
   Hancock, R., "Next Steps in Signaling: Framework", Internet Draft (work in progress), October 2004.
   Bosch, S., Karagiannis, G. and A. McDonald, "NSLP for Quality-of-Service signaling", Internet Draft (work in progress), October 2004.

The contents of this document are incorporated by reference herein.

The NSIS QoS application signaling protocol, which is currently under specification, is fundamentally similar to the RSVP signaling protocol. For instance, the proposed NSIS QoS application signaling protocol supports most of the extensions that have been made for the RSVP signaling protocol including the RSVP aggregation method.

The multiservice IP network also needs to provide emergency priority services not only for traditional telephony calls but also for other real-time applications like video streams and audio-video conference calls. Even though emergency traffic is high priority traffic, it also needs to have resource reservations made within the IP routers that are on the data path to protect it from background traffic. If there are not enough resources to make the reservation for the high priority traffic, then one or more lower priority reservations have to be pre-empted so that the higher priority reservation can be accepted. This pre-emption policy is described in detail within the following document:

S. Herzog, "Signaled Preemption Priority Policy Element", RFC 3181, October 2001.

The contents of this document are incorporated by reference herein.

In view of this pre-emption policy, it can be seen that the current RSVP signaling protocol requires the termination of low priority traffic flow(s) when there are not enough resources for the emergency reservation. This can be a serious problem especially in the case of aggregated reservation when the whole aggregate has to be terminated if there are no free resources for the emergency reservation. Several different devices and methods have been proposed in an attempt to address this problem. One such device and one method and their associated drawbacks are briefly described below.

In one attempt, an adaptive resource broker was used which controlled all of the resources in the multiservice IP network. The adaptive resource broker and a mathematical background of this problem are discussed in the following document:

G. Feher, L. Cselenyi, L. Gefferth: Intelligence Resource Management Agent for Multimedia Teleservices, Proc. Of COST 254 workshop, pp 189-195, Neuchatel, Switzerland, 1999.

In this adaptive resource broker, the resources assigned to the flows in the network could be aligned adaptively to the network conditions. Unfortunately, this solution has many drawbacks several of which are described next. First, the adaptive resource broker requires information about the whole network, like network topology, traffic matrix etc., which in turn requires additional signaling, or configuration. And, all of this required information is less likely to be available in a multi-domain network. Secondly, the adaptive resource broker may require that an additional node or intelligence be added to the network. Thirdly, the adaptive resource broker is a centralized solution because decisions are made based on more than local information. As a result, the security requirements are demanding and the redundancy of the node has to be solved.

In another attempt, a method has been used to reserve in advance the resources needed for priority traffic. However, this method requires previous knowledge or estimation of the volume of the expected emergency traffic. In addition, this method is not that efficient with the usage of bandwidth because the provisioned resources need to be reserved in time periods when emergency traffic is not going to use those reserved resources. Accordingly, there is and has been a need for a solution that addresses and solves the drawbacks associated with the aforementioned solutions that attempt to reserve resources for a high priority traffic flow without requiring the termination of low priority traffic flows. This need and other needs are addressed by the multiservice IP network, IP router and method of the present invention.

BRIEF DESCRIPTION OF THE INVENTION

The present invention includes a multiservice IP network and a method that support an enhanced QOS message which makes it possible for an IP router to reserve resources for and admit a high priority traffic flow without needing to terminate an existing low priority traffic flow. In accordance with the present invention, in the event an emergency reservation request arrives at an IP router and there are not enough resources to support the high priority traffic flow, then the IP router reduces the reservation of one or more low priority traffic flows to a reduced level. The IP router also sends a notification message to the sender indicating that the reservations have been reduced. Thereafter, the high priority traffic flow can be admitted. As such, if there is enough adaptive traffic in the multiservice IP network, then the low priority calls need not be terminated instead only the resources are reduced to a lower but still acceptable QoS level. And, when traffic conditions improve then the reduced reservations can be increased back to the original level.

BRIEF DESCRIPTION OF THE DRAWINGS

A more complete understanding of the present invention may be had by reference to the following detailed description when taken in conjunction with the accompanying drawings wherein:

FIG. 5 is a diagram that illustrates the parameters of a minimum QoS object which is part of the enhanced QoS message.

DETAILED DESCRIPTION OF THE DRAWINGS

Figure 1A:
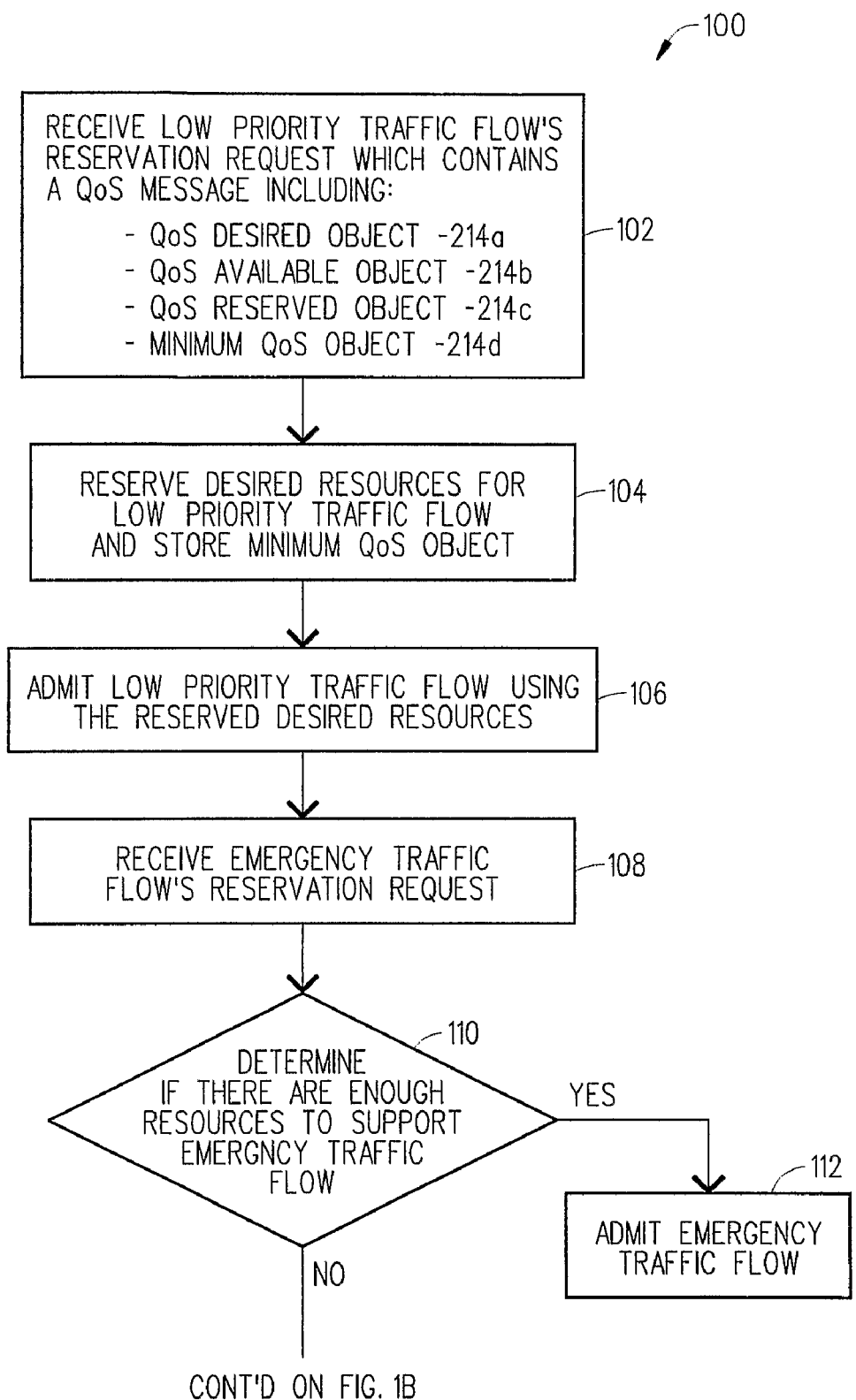
FIG. 1 is a flowchart that illustrates the steps of a preferred method for using an enhanced QoS message which makes it possible for a multiservice IP network and in particular IP router(s) to reserve resources for an emergency traffic flow and then admit the emergency traffic flow without needing to terminate an existing low priority traffic flow in accordance with the present invention.
Figure 1B:
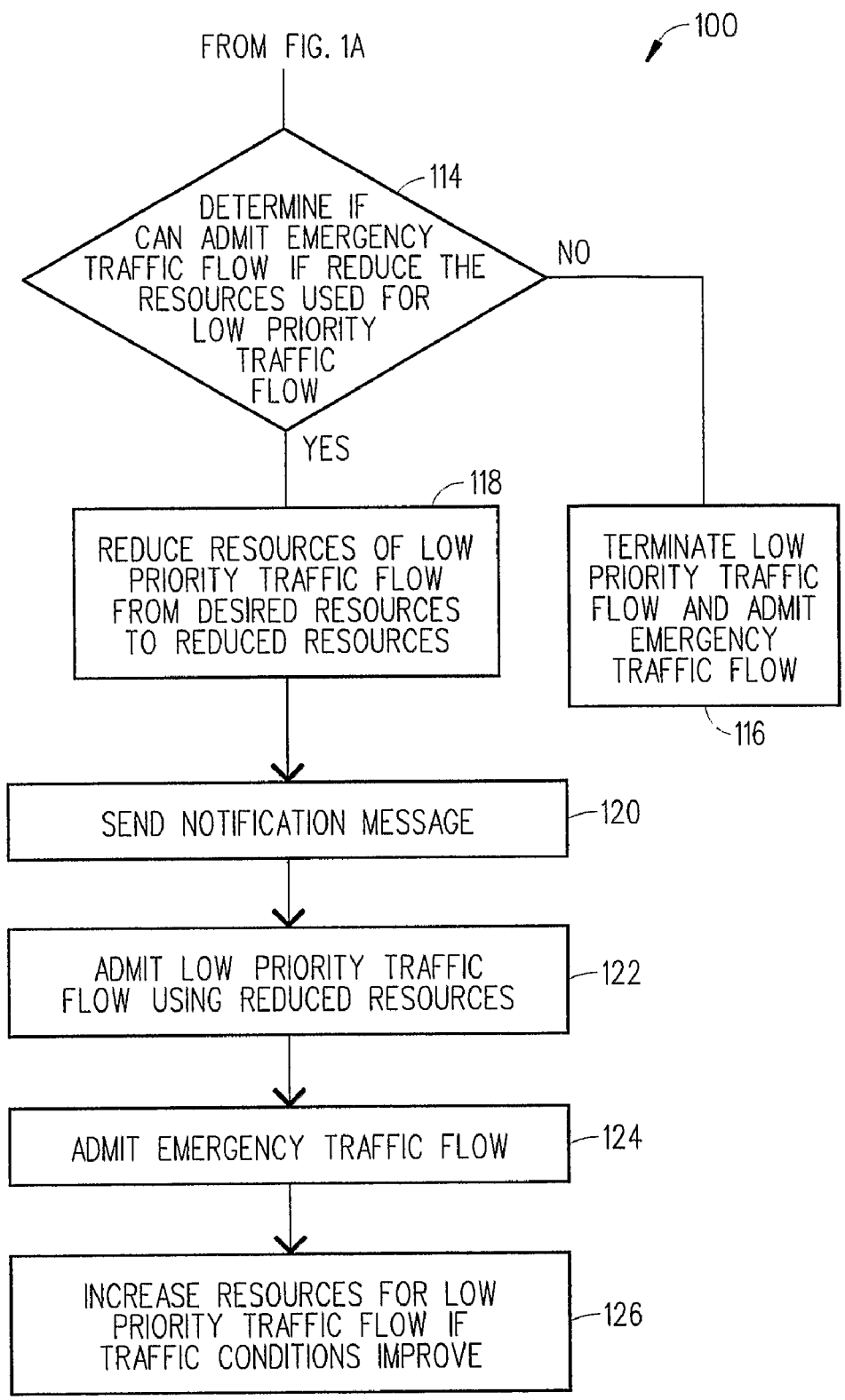
Figure 2:
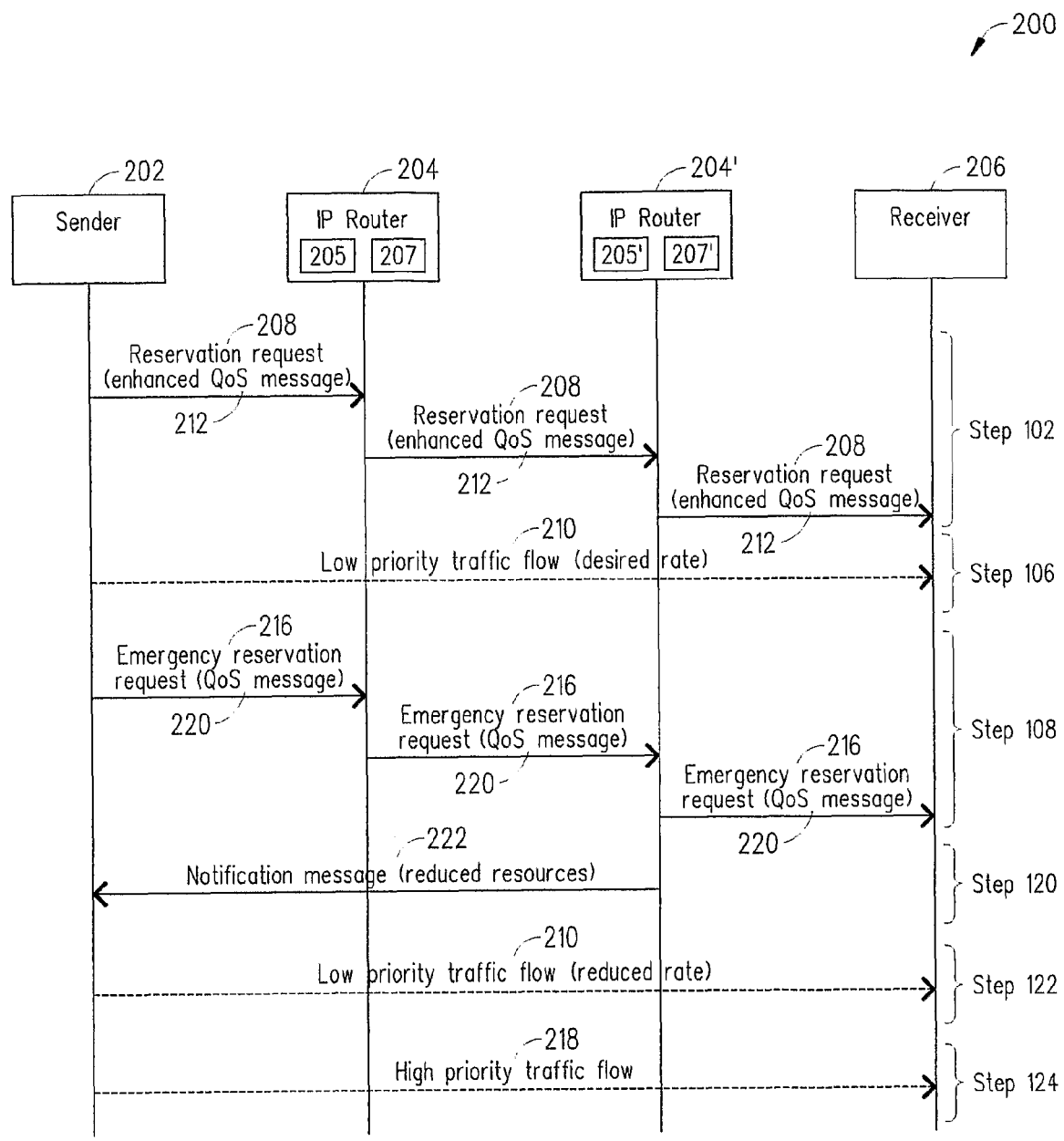
FIG. 2 is a block diagram that illustrates an exemplary multiservice IP network and a signal flow chart which are used to help describe the steps of the preferred method shown in FIG. 1.

Referring to FIG. 1, there is a flowchart that illustrates the basic steps of a preferred method 100 which uses an enhanced QoS message that contains two levels of resource reservations which makes it possible for a multiservice IP network and in particular IP router(s) to reserve resources for and then admit an emergency traffic flow without needing to terminate an existing low priority traffic flow. To aid in the discussion of method 100, an exemplary multiservice IP network 200 is used which is shown in FIG. 2. The exemplary multiservice IP network 200 includes a sender 202, two IP routers 204 and 204' (only two shown) and a receiver 206. It should be understood that certain details associated with the multiservice IP network 200 and its' components are well known in the industry. Therefore, for clarity, the description provided below omits those well known details about the multiservice IP network 200 and its' components that are not necessary to understand the present invention.

Beginning at step 102, the IP routers 204 and 204' receive a reservation request 208 for a low priority traffic flow 210. The receiver 206 also receives the reservation request 208. The sender 202 sends the reservation request 208 which contains an enhanced QoS message 212 (QoS Description 212) that includes the following objects:

A QoS desired object 214a which contains parameters that indicate the desired resources (e.g., bandwidth) which are needed to have a desired QoS for the real-time low priority traffic flow 210;

A minimum QoS object 214d which contains parameters that indicate the reduced resources (e.g., bandwidth) which are needed to have a minimum acceptable QoS for the real-time low priority traffic flow 210 (see FIG. 5).

And in some cases, not specified here:

A QoS available object 214b which contains parameters describing the available resources along a reservation path.

A QoS reserved object 214c which contains parameters describing the reserved resources and related QoS parameters (e.g. Slack Term).

Upon receiving the reservation request 208, the IP routers 204 and 204' store within their memories 205 and 205' the information associated with resources needed for both the desired QoS and the minimum acceptable QoS.

At step 104, the IP routers 204 and 204' and in particular their processors 207 and 207' reserve the desired resources for the low priority traffic flow 210. Again, the desired resources are identified in the QoS desired object 214a. In addition, the receiver 206 reserves the desired resources for the low priority traffic flow 210. Step 104 is not shown in FIG. 2.

At step 106, the IP routers 204 and 204' admit the low priority traffic flow 210 using the desired resources that are associated with the QoS desired object 214a. In addition, the receiver 206 admits the low priority traffic flow 210 using the desired resources.

At step 108, the IP routers 204 and 204' receive an emergency reservation request 216 for an emergency traffic flow 218. The sender 202 sends the emergency reservation request 216 that contains a QoS message 220 (QoS Description 220). The QoS message 220 does not need to have the same objects that are in the enhanced QoS message 212. For instance, the QoS message 220 may not have a minimum QoS object 214d.

At step 110, the IP routers 204 and 204' and in particular their processors 207 and 207' make a determination as to whether or not they have enough resources to support the emergency traffic flow 218. If the IP routers 204 and 204' have enough resources, then at step 112 they reserve the desired resources and admit the emergency traffic flow 218. At the same time, the IP routers 204 and 204' still use the desired resources to support the low priority traffic flow 210. Steps 110 and 112 are not shown in FIG. 2.

If one of the IP routers 204 and 204' (for example IP router 204') does not have enough resources, then that IP router 204' at step 114 determines if it can accept the emergency traffic flow 218 if it reduced the resources for the low priority traffic flow 210 from the desired resources to the reduced resources. Step 114 is not shown in FIG. 2.

If the IP router 204' cannot support the emergency traffic flow 218 even if it reduced the resources for the low priority traffic flow 210, then the IP router 204' at step 116 would terminate the low priority traffic flow 210 and admit the emergency traffic flow 218. Step 116 is not shown in FIG. 2. An exemplary policy on exactly which low priority traffic flow(s) 210 (only one described above) is/are terminated is described below with respect to FIGS. 3 and 4.

If the IP router 204' can support the emergency traffic flow 218 by reducing the resources of the low priority traffic flow 210, then the IP router 204' at step 118 reduces the resources of the low priority traffic flow 210 from the desired QoS to the minimum acceptable QoS. Step 118 is not shown in FIG. 2.

Then at step 120, the IP router 204' sends a notification message 222 to the receiver 202 which indicates that the resources for the low priority traffic flow 210 have been reduced to the minimum acceptable QoS. It should be noted that this process does not require any prior negotiation between the sender 202 and IP router 204'. In other words, the IP router 204' determines by itself to reduce the resources for the low priority traffic flow 210.

At step 122, the IP routers 204 and 204' admit the low priority traffic flow 210 using the reduce resources associated with the minimum QoS object 214d. The receiver 206 also admits the low priority traffic flow 210 using the reduced resources.

At step 124, the IP routers 204 and 204' admit the emergency traffic flow 218 using the desired resources identified in the QoS message 220. The receiver 206 also uses the desired resources to admit the emergency traffic flow 218.

At step 126, the IP router 204' can increase the resources back to the desired QoS for the affected low priority traffic flow 210 if there is an improvement in traffic conditions. How this can be done with refresh messages is described in greater detail below with respect to FIGS. 3 and 4. As can be seen, step 126 is not shown in FIG. 2.

An important aspect of method 100 is that there is a possibility that the low priority traffic flow 210 need not be terminated because of the addition of an emergency call 218 (see steps 110, 114, 118, 120 and 122). This is all possible because many real-time traffic types transported in IP networks 200 are adaptive to the bandwidth rate. For example, adaptive multi rate (AMR) coded voice traffic can use different codec rates and the required bandwidth for transporting it varies according to the codec rate. The advantage of this adaptive behavior is twofold: (1) if the transmission conditions are favorable a reduced codes rate is enough to provide an acceptable QoS; and (2) the transmission rate can be decreased from the ideal rate usually without degrading the QoS significantly. In many cases this lower level QoS is still acceptable for the user or at least much preferable than terminating the traffic 210 suddenly due to e.g. an emergency call 218. Two exemplary embodiments of how method 100 can be implemented in accordance with NSIS QoS application and RSVP signaling protocols are described next with respect to FIGS. 3 and 4.

Figure 3:
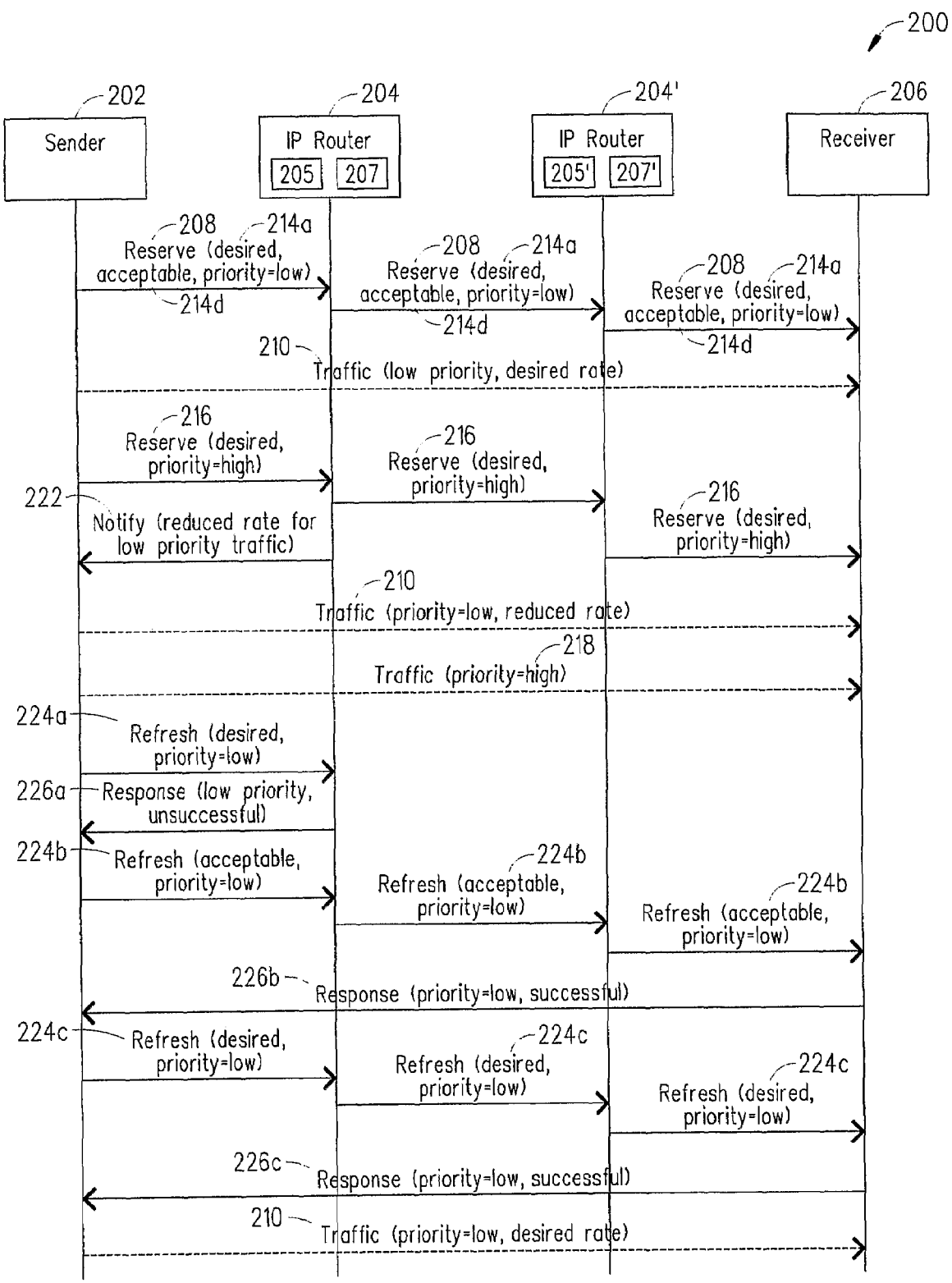
FIG. 3 is a signal flow diagram that illustrates one scenario as to how the exemplary multiservice IP network shown in FIG. 2 can use the enhanced QoS message to admit an emergency traffic flow without needing to terminate an existing low priority traffic flow using NSIS in accordance with one embodiment of the present invention.

Referring to FIG. 3, there is a signal flow diagram that illustrates one scenario as to how the exemplary multiservice IP network 200 can use the enhanced QoS message 212 in conjunction with the NSIS QoS application protocol to admit an emergency traffic flow 218 without needing to terminate an existing low priority traffic flow 210. As shown, the sender 202 initiates the reservation message 208 for a low priority traffic flow 210. The reservation message 208 contains QoS descriptors 214a and 214d for both the reserved resources (desired resources) and the reduced resources (minimum acceptable QoS). Reservation is made based on the desired resources in each IP router 204 and 204' along the data path.

After the successful reservation in each IP router 204 and 204', the low priority traffic 210 is admitted using the standard desired traffic rate. When a high priority reservation request 216 arrives, the high priority reservation is made in each IP router 204 and 204'. In this scenario, assume that one of the IP routers 204 (for example) does not have enough resources to accommodate both the low priority traffic flow 210 and the high priority traffic flow 218. This IP router 204 makes the reservation for the high priority traffic flow 218 and reduces the reservation of the low priority traffic flow 210 (only one shown) to the acceptable level. The IP router 204 then sends the sender 202 a notification message 222 that indicating that the reserved resources are reduced and the transmission should be reduced to the acceptable rate for the affected low priority traffic flow 210. The low priority traffic flow 210 is then sent at the reduced rate. After this the high priority traffic 218 can be admitted. It should be noted that there can be more than one affected low priority flow 210 and that number depends on the amount of resources that are needed for the high priority traffic flow 218. A discussion is provided below about the rest of the signals that are shown in FIG. 3.

Figure 4:
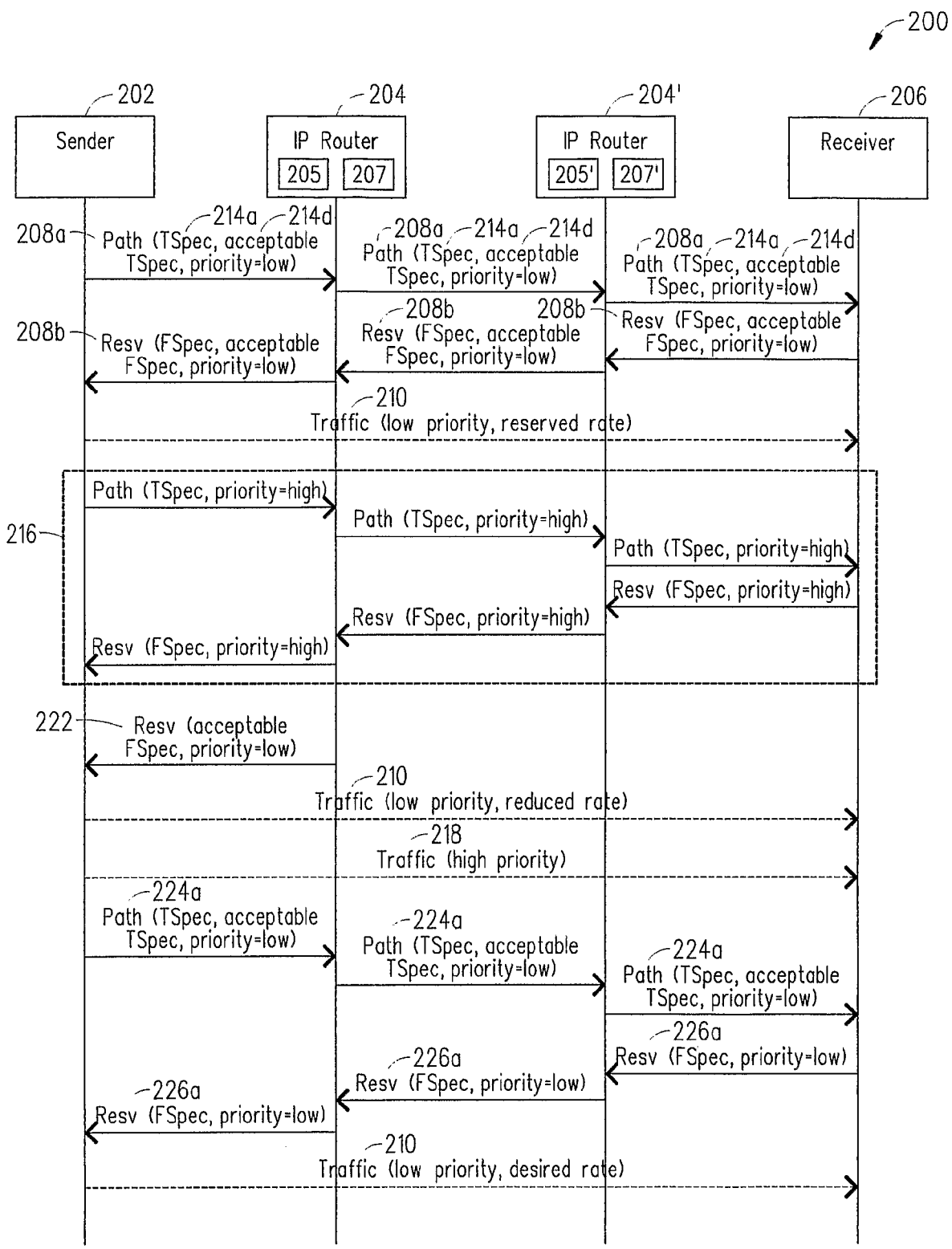
FIG. 4 is a signal flow diagram that illustrates one scenario as to how the exemplary multiservice IP network shown in FIG. 2 can use the enhanced QoS message to admit an emergency traffic flow without needing to terminate an existing low priority traffic flow using RSVP in accordance with a second embodiment of the present invention.

Referring to FIG. 4, there is a signal flow diagram that illustrates one scenario as to how the exemplary multiservice IP network 200 can use the enhanced QoS message 212 in conjunction with the RSVP protocol to admit an emergency traffic flow 218 without needing to terminate an existing low priority traffic flow 210. As shown, the sender 202 sends a path message 208a which advertises the low priority traffic stream 210. The path message 208a may contain a sender traffic specification object (TSpec 214a) describing the reserved resources and may also contain an acceptable sender traffic specification object (TSpec 214d) describing the traffic specification of the acceptable rate. Priority may be indicated as well. In response to the path message 208a, the receiver 206 sends a resv message 208b containing a flow specification object (FSpec) for the desired rate and an acceptable flow specification object (acceptable FSpec) for the reduced rate. The priority can be indicated as well. After successful reservation for the desired rate, the low priority traffic flow 210 can be sent at the desired rate from sender 202 to receiver 206. When a reservation 216 for an emergency flow traffic 218 is made by another set of path and resv messages, the high priority reservation is made in each IP router 204 and 204'. In this scenario, assume that one of the IP routers 204 (for example) does not have enough resources to accommodate both the low priority traffic flow 210 and the high priority traffic flow 218. This IP router 204 makes the reservation for the high priority traffic flow 218 and reduces the reservation of the low priority traffic flow 210 (only one shown) to the acceptable level. The IP router 204 then sends the sender 202 a resv message 222 (notification message 222) that indicates the resources should be reduced to the reduced rate for the affected low priority traffic flow 210. The low priority traffic flow 210 is then sent at the reduced rate. After this the high priority traffic 218 can be admitted. It should be noted that there can be more than one affected low priority flow 210 and that number depends on the amount of resources that are needed for the high priority traffic flow 218.

In both scenarios, after the traffic rate of the low priority traffic flow 210 has been reduced, the sender 202 may send a refresh message 224a with a desired rate for the low priority traffic flow 210 to try to restore the low priority traffic flow 210 to the reserved traffic rate. In this way, the reservations for the low priority traffic 210 may be increased in each IP router 204 and 204' after a certain time period if the traffic conditions improve (see step 126 in FIG. 1). If the reservation with the desired QoS is not possible in an IP router 204 and 204', then this IP router sends back an error message to the sender 202 indicating that increasing the traffic rate for the low priority flow is not possible. In this case, the sender 202 should immediately initiate a refresh with the reduced rate. Alternatively, the sender 202 can send a first refresh message 224a with an acceptable rate for the low priority traffic flow 210 so that it remains at a reduced acceptable rate for at least a certain period of time. Different exemplary refresh scenarios are discussed next.

In the exemplary refresh scenario shown in FIG. 3, the sender 202 sends a first refresh message 224a which contains the QoS specification for the desired rate to IP router 204 (for example). In this example, the IP router 204 still cannot reserve resources at the desired rate for the low priority traffic flow 200. As such, the IP router 204 sends the sender 202 a response message 226a which indicates that the first refresh message 224a was not successful. The sender 202 immediately sends a new refresh message 224b which contains the QoS specification for the reduced rate to IP routers 204 and 204' and receiver 206. The receiver 206 then sends a response message 226b which indicates that the second refresh message 226a was successful. Then, the sender 202 sends another refresh message 224c which contains the QoS specification for the desired rate to IP router 204. This time, the IP router 204 can reserve resources at the desired rate for the low priority traffic flow 200. Therefore, the refresh message 224c is forwarded further to the receiver 206. The receiver 206 then sends a response message 226c back to the sender 202. This response message 226c indicates that it is ok to upgrade the resources for the low priority traffic flow 210. Finally, the sender 202 uses the desired rate to send the low priority traffic flow 210 to the receiver 206 via IP routers 204 and 204'.

A similar mechanism can be applied as well for the scenario shown in FIG. 4. The difference in this scenario is that here the receiver 206 receives the refresh/path message 224a which contains the TSpec and acceptable TSpec and the receiver 206 decides if the refresh should be tried at the reserved rate or the acceptable rate. In this example, the reservation is attempted with the desired rate so the receiver 206 sends a desired FSpec object in resv message 226a to the sender 202. In this example, this reservation is successful for the first attempt. The sender 202 then increases the traffic rate of the low priority traffic flow 210.

Several other refresh mechanisms can be applied which attempt to restore the desired reservation for the low priority flow 210. One possibility is that in the refresh message 224a besides the desired QoS object 214a and the minimum QoS object 214d also includes a reserved QoS object 214c. This refresh is tried for the desired QoS in IP routers 204 and 204', if it is not successful then the refresh is done for minimum QoS. It is also possible to use reserved QoS for a traffic rate between the minimum and desired level. In this case, the reserved QoS object 214c carries information about the reserved resources in the previously passed IP router(s). This object is updated in each IP router only if the reserved resources in the given IP router are lower than the reserved resources in previous IP routers. In this way, the reserved QoS object 214c is going to contain the minimum of the reserved resources in the date path. It can also contain values for the desired QoS, the minimum QoS or values between them. This reserved QoS is signaled back to the sender 202 in a response message. It should be noted that, any case, when even the minimum QoS cannot be refreshed, this is an erroneous situation and the standard error handling procedure implemented in a given method is used.

Moreover, in both scenarios shown in FIGS. 3 and 4, if enough resources cannot be obtained for the emergency traffic flow 218 by reducing the reservations, then one or more low priority traffic flows 210 should be terminated (see step 116 in FIG. 1). A local policy can be used to determine the order in which low priority traffic flows 210 are terminated. For instance, pre-emption of the low priority traffic flows 210 can be done in priority order, starting with the lowest priority reservations. And, among the reservations with the same priority, the reservations of low priority traffic flows 210 for which reduced resources are not indicated may be preempted first. In this way, the users may have more of an interest to fill in the reduced resource field 214d in the QoS specification object 212. However, it should be noted that indicating reduced resources in the QoS specification object 212 is not mandatory.

Referring to FIG. 5, there is a diagram that illustrates the parameters of an exemplary minimum QoS object 214d which can be part of the enhanced QoS message 212. The exemplary minimum QoS object 214d shown is related to the QoS desired object 214a which has a traffic specification form based on an Integrated Services (IntServ) token bucket and a simple reserved rate. The QoS desired object's token bucket model has 5 parameters: token bucket rate (r), token bucket size (b), peak data rate (p), minimum policed unit (m), maximum packet size (M). In some cases the reserved rate (R) is also signaled, or only R is signaled. Each parameter is encoded in 32 bits. The exact definition of these parameters can be found in the aforementioned RFC 2210.

The traffic specification form for the minimum QoS object 214d can have a similar token bucket descriptor as shown in FIG. 5. As can be seen, the new token bucket descriptor has 5 parameters: acceptable token bucket rate (ar), acceptable token bucket size (ab), acceptable peak data rate (ap), acceptable minimum policed unit (am), acceptable maximum packet size (aM). In some cases the acceptable reserved rate (aR) can also be signaled, or only aR is signaled. Each parameter is encoded in 32 bits. The relationship between the parameters of the minimum QoS object 214d and the Qos desired object 214a are as follows: $ar \leq r$, $ab \leq b$, $p \leq ap$, $aM \leq M$; $aR \leq R$. In an alternative embodiment, since the descriptors for the acceptable QoS can be the same parameter set as the QoS descriptors, it may be enough to store the regular QoS descriptors and a factor that describes the relative values of the acceptable parameters comparing to the regular ones.

One useful application of the present invention is how it can be used to enhance the aggregated reservation. In this application, the reservation and reduced reservation parameters of the enhanced QoS message 212 refer to a whole aggregated flow. The present invention is especially useful in this application because emergency reservation can be supported without terminating the whole aggregate of low priority traffic flows 210. The number of reservation states in the case of aggregated reservation is low because per micro-flow states are not stored. Therefore, storing the reduced reservation states in addition to the reservation states is not an issue.

Following are some additional features, advantages and uses of the present invention:

(1) It should be noted that that multiservice IP network can be any type of telecommunication network which uses IP as a transport technology.

(2) In PCT Patent Application WO 03/075523 there is described a QoS manager that distributes the resources between applications of one special network, e.g. UMTS or GPRS. And, the QoS manager is implemented in a telecom control node e.g., SGSN. In contrast, the present invention is related to the resource reservation in the IP transport layer, i.e., in the IP routers. And, the present invention is based on standard resource reservation protocols that can be implemented in commodity routers. Moreover, the traditional QoS manager is able to control only the traffic for which control plane it belongs to, i.e., UMTS. As such, it cannot be used for pre-empting resources in a multiservice IP network. In contrast, the present invention has a resource management function that is implemented in a standard resource reservation protocol in the transport layer, in a lower layer, which is common for all applications. Therefore, pre-emption of resources for a high priority traffic can be performed in the multiservice IP network.

Although two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. An IP router comprising:
a processor for utilizing a resource reservation protocol to reserve resources for an emergency traffic flow so the emergency traffic flow can be admitted without terminating an existing low priority traffic flow by facilitating the following:
receiving, from a sender, a reservation request for the low priority traffic flow, wherein said reservation request includes:
a QoS message which indicates desired resources that are needed to have a desired QoS for the low priority traffic flow and also indicates reduced resources that are needed to have a minimum acceptable QoS for the low priority traffic flow;
reserving the desired resources for the low priority traffic flow;
admitting the low priority traffic flow using the desired resources associated with the desired QoS;
receiving, from said sender, an emergency reservation request for the emergency traffic flow;
reducing resources for the low priority traffic flow from the desired QoS to the minimum acceptable QoS if there are not enough resources to support the emergency traffic flow;
sending, to said sender, a notification message indicating that the resources have been reduced to the minimum acceptable QoS for the low priority traffic flow;
admitting the low priority traffic flow using the reduced resources associated with the minimum acceptable QoS; and
admitting the emergency traffic flow.

2. The IP router of claim 1, further comprising a memory for storing information about the desired resources and the reduced resources.

3. The IP router of claim 1, wherein the resource reservation protocol is RSVP.

4. The IP router of claim 1, wherein the resource reservation protocol is NSIS QoS application.

5. A method for reserving resources for an emergency traffic flow and admitting the emergency traffic flow without terminating an existing low priority traffic flow, said method comprising the steps of:
receiving, from a sender, a reservation request for the low priority traffic flow, wherein said reservation request includes:
a QoS message which indicates desired resources that are needed to have a desired QoS for the low priority traffic flow and also indicates reduced resources that are needed to have a minimum acceptable QoS for the low priority traffic flow;
reserving the desired resources for the low priority traffic flow;
admitting the low priority traffic flow using the desired resources associated with the desired QoS;
receiving, from said sender, an emergency reservation request for the emergency traffic flow;
reducing resources for the low priority traffic flow from the desired QoS to the minimum acceptable QoS if there are not enough resources to support the emergency traffic flow;
sending, to said sender, a notification message indicating that the resources have been reduced to the minimum acceptable QoS for the low priority traffic flow;
admitting the low priority traffic flow using the reduced resources associated with the minimum acceptable QoS; and
admitting the emergency traffic flow.

6. The method of claim 5, further comprising the step of:
increasing the resources back to the desired QoS for the low priority traffic flow if there is an improvement in traffic conditions.

7. The method of claim 5, further comprising the step of:
terminating the low priority traffic flow if enough resources for the emergency traffic flow cannot be obtained by reducing the resources of the low priority traffic flow from the desired QoS to the minimum acceptable QoS.

8. The method of claim 7, wherein if more than one low priority traffic flow needs to be terminated then the first one that is terminated is the low priority traffic flow that had a QoS message that did not indicate the reduced resources for the minimum acceptable QoS.

9. The method of claim 5, wherein said low priority traffic flow is part of an aggregated low priority traffic flow.

10. The IP router of claim 1, wherein said QoS message comprises:
a QoS description object which includes a QoS desired object which indicates desired resources that are needed to have a desired QoS for an IP real-time traffic flow; and
said QoS description object also includes a minimum QoS object which indicates reduced resources that are needed to have a minimum acceptable QoS for the IP real-time traffic flow, wherein said minimum QoS object includes the following parameters:
a reserved rate (R);

a token bucket;
QoS class; and
priority.

11. The IP router of claim 10, wherein said token bucket includes the following parameters:
an acceptable token bucket rate (ar);
an acceptable token bucket size (ab);
an acceptable peak data rate (ap);
an acceptable minimum policed unit (am); and
an acceptable maximum packet size (M).

12. The IP router of claim 11, wherein said token bucket further includes an acceptable reserved rate (aR).

13. The IP router of claim 12, wherein said parameters of the token bucket associated with said minimum QoS object have values less than corresponding parameters in a token bucket associated with said QoS desired object.

14. The IP router of claim 10, wherein said QoS description object is associated with an RSVP resource reservation protocol.

15. The IP router of claim 10, wherein said QoS description object is associated with an NSIS resource reservation protocol.

16. A multiservice IP network, comprising:
a sender;
at least one router; and
a receiver;
said sender transmits a reservation/path message for a low priority traffic flow, said reservation/path message includes a QoS message which indicates desired resources that are needed to have a desired QoS for the low priority traffic flow and also indicates reduced resources that are needed to have a minimum acceptable QoS for the low priority traffic flow;
said at least one router reserves the desired resources for the low priority traffic flow;
said sender uses the desired resources and transmits the low priority traffic flow;
said at least one router and said receiver utilizes the desired resources to admit the low priority traffic flow;
said sender transmits a reservation/path message for a high priority traffic flow;
if one of said at least one router does not have enough resources to accommodate both the low priority traffic flow and the high priority traffic flow, then said one router reserves the desired resources for the high priority traffic flow and reduces the desired resources to the reduced resources for the low priority traffic flow;
said one router sends said sender a notification message indicating that the low priority traffic flow should be transmitted using the reduced resources instead of the desired resources;
said sender uses the reduced resources and transmits the low priority traffic flow;
said at least one router and said receiver utilizes the reduced resources to admit the low priority traffic flow;
said sender transmits the high priority traffic flow; and
said at least one router and said receiver admits the high priority traffic flow.

17. The multiservice IP network of claim 16, wherein:
said one router increases the resources back to the desired resources for the low priority traffic flow when there is an improvement in traffic conditions.

18. The multiservice IP network of claim 16, wherein:
said one router terminates the low priority traffic flow if enough resources for the high priority traffic flow cannot be obtained by reducing the reservation for the low priority traffic flow from the desired resources to the reduced resources.

19. The multiservice IP network of claim 16, wherein said low priority traffic flow is part of an aggregated low priority traffic flow.

* * * * *

UNITED STATES PATENT AND TRADEMARK OFFICE
CERTIFICATE OF CORRECTION

PATENT NO. : 7,760,644 B2  Page 1 of 1
APPLICATION NO. : 11/817737
DATED : July 20, 2010
INVENTOR(S) : Bader It is certified that error appears in the above-identified patent and that said Letters Patent is hereby corrected as shown below:

On the title page, item (57), under "ABSTRACT", in Column 2, Line 2, delete "QOS" and insert -- QoS --, therefor.

In Column 2, Line 33, delete "pre-emptied" and insert -- pre-empted --, therefor.

In Column 3, Line 25, delete "QOS" and insert -- QoS --, therefor.

In Column 5, Line 66, delete "codes" and insert -- codec --, therefor.

In Column 8, Line 29, delete "preempted" and insert -- pre-empted --, therefor.

In Column 8, Line 57, delete "Qos" and insert -- QoS --, therefor.

Signed and Sealed this

Nineteenth Day of October, 2010

David J. Kappos
*Director of the United States Patent and Trademark Office*